United States Patent
Fricker

(10) Patent No.: US 7,636,506 B2
(45) Date of Patent: Dec. 22, 2009

(54) OPTICAL FIBER MANAGEMENT IN A CHASSIS-BASED NETWORK SYSTEM

(75) Inventor: Jean-Philippe Fricker, Mountain View, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 784 days.

(21) Appl. No.: 10/843,898

(22) Filed: May 12, 2004

(65) Prior Publication Data

US 2004/0228634 A1  Nov. 18, 2004

Related U.S. Application Data

(60) Provisional application No. 60/470,168, filed on May 13, 2003.

(51) Int. Cl.
*G02B 6/00* (2006.01)
(52) U.S. Cl. .................................. 385/134; 385/135
(58) Field of Classification Search .................. 385/134
See application file for complete search history.

(56) References Cited

U.S. PATENT DOCUMENTS

| 6,363,198 | B1 | 3/2002 | Braga et al. |
| 6,516,105 | B1 * | 2/2003 | Khusid et al. ............... 385/15 |
| 6,698,937 | B2 * | 3/2004 | Grimes et al. .............. 385/53 |
| 2002/0150369 | A1 | 10/2002 | Battey et al. |
| 2002/0181896 | A1 | 12/2002 | McClellan et al. |

* cited by examiner

*Primary Examiner*—Frank G Font
*Assistant Examiner*—Mary A El Shammaa
(74) *Attorney, Agent, or Firm*—Wilson & Ham Patent Attorneys

(57) ABSTRACT

A technique for optical fiber management in a chassis-based network system involves using a blind mating optical interface at the back of a line card and an optical transceiver interface that is accessible from the front of the line card. The blind mating optical interface and the transceiver interface are optically connected by an optical signal path that includes and optical fiber. When the line card is secured within a compatible chassis, the blind mating optical interface of the line card connects to a blind mating optical interface of the chassis and creates an optical connection between an external optical fiber and the transceiver interface.

12 Claims, 9 Drawing Sheets

OPTICAL FIBER MANAGEMENT IN A CHASSIS-BASED NETWORK SYSTEM

CROSS-REFERENCE TO RELATED APPLICATION

This application is entitled to the benefit of provisional Patent Application Ser. No. 60/470,168, filed 13 May 2003.

FIELD OF THE INVENTION

The invention relates generally to chassis-based network systems such as switches and routers, and more particularly to the management of fiber optic connections to chassis-based network systems.

BACKGROUND OF THE INVENTION

Network systems such as switches and routers often consist of a chassis and multiple removable line cards. The line cards are customized to perform specific functions such as control, switch, and interface functions. The line cards slide into "slots" of the chassis and communicate between each other through a backplane. Line cards that perform interface functions often include electrical and/or optical interfaces that allow the network system to be connected via electrical wires or optical fibers to other network system. In order to increase the capacity of the network system, it is often desirable to increase the density of interfaces on each line card. For example, a single line card may include eight, sixteen, or thirty-two different optical interfaces that are connected at the front panel of the line card. These optical interfaces are either individually connected to the front panel of the line card at individual interfaces or connected to the front panel by parallel connectors if the corresponding optical fibers are bundled into parallel optical fiber bundles (also known as "ribbon cables").

When optical fibers are individually connected to the front panel of a line card, each of the optical fibers must be individually disconnected to remove the line card from the chassis. Disconnecting and connecting each individual optical fiber is a time consuming and error prone process. When the optical fibers are connected to a line card by a ribbon fiber, it is impossible to individually disconnect a single fiber. Because a single fiber cannot be individually disconnected, multiple fibers must be disconnected to service or test any single port of the line card.

In view of the above-described concerns, what is needed is an optical fiber management technique for a chassis-based network system that is easy to use and that is compatible with parallel optical fiber bundles.

SUMMARY OF THE INVENTION

A technique for optical fiber management in a chassis-based network system involves using a blind mating optical interface at the back of a line card and an optical transceiver interface that is accessible from the front of the line card. The blind mating optical interface and the transceiver interface are optically connected by an optical signal path that includes and optical fiber. When the line card is secured within a compatible chassis, the blind mating optical interface of the line card connects to a blind mating optical interface of the chassis and creates an optical connection between an external optical fiber and the transceiver interface. Using the above-described optical fiber management technique, the line card can be removed from the chassis without disconnecting the optical fiber from the transceiver interface. Major benefits of the optical fiber management technique are realized when a line card and chassis are configured to support multiple optical fiber connections, especially in networks with large numbers of optical fibers and in networks that utilize parallel optical fiber bundles, also known as ribbon cables.

Other aspects and advantages of the present invention will become apparent from the following detailed description, taken in conjunction with the accompanying drawings, illustrating by way of example the principles of the invention.

BREIF DESCRIPTION OF THE DRAWINGS

Throughout the description, similar reference numbers may be used to identify similar elements.

DETAILED DESCRIPTION

A technique for optical fiber management in a chassis-based network system involves using a blind mating optical interface at the back of a line card and an optical fiber that is connected to the blind mating optical interface and extends out of the front of the line card to an optical transceiver interface that is accessible from the front of the line card. When the line card is secured within a compatible chassis, the blind mating optical interface of the line card connects to a blind mating optical interface of the chassis and creates an optical signal connection between an external optical fiber and the transceiver interface.

Figure 1:
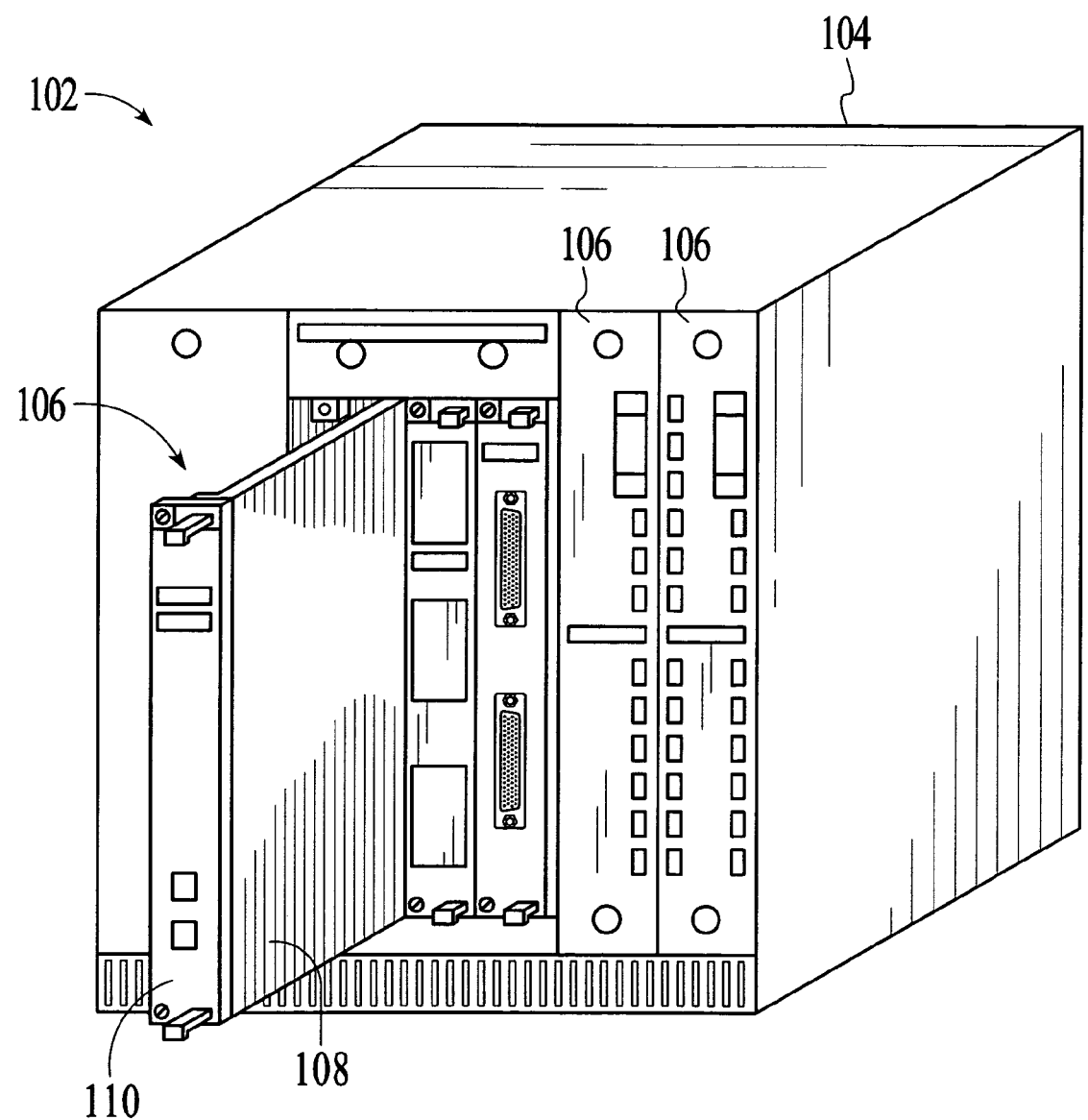
FIG. 1 depicts a chassis-based network system that is used in networking environments.

FIG. 1 depicts a chassis-based network system 102 that includes a chassis 104 and various line cards 106. The chassis is a mechanical enclosure, or housing, which includes "slots" that hold the line cards. The line cards are function-specific devices that can be individually removed from the chassis while the system is in operation. The chassis can hold multiple line cards and the line cards are electrically connected to each other within the chassis by a communications interface (not shown), referred to herein as a "backplane" and sometimes referred to as a "midplane." The backplane enables electronic signals from one line card to be transferred to other line cards. The chassis-based network system has a front side and a back side. The front side of the chassis-based network system is where the line cards are inserted to and removed from the chassis and is typically more easily accessible to service technicians than the back side when the chassis is fixed within a communications center. The front side of the chassis also includes the controls and indicators that are manipulated and monitored by service technicians. The back side of the chassis-based network system is typically more difficult to access when the system is fixed within a communications center and includes few, if any, elements that require servicing. In some configurations, the chassis receives line cards from the front and the back and the line cards connect at a midplane. An example, of a midplane-based system is described below with reference to FIG. 9.

Figure 2:
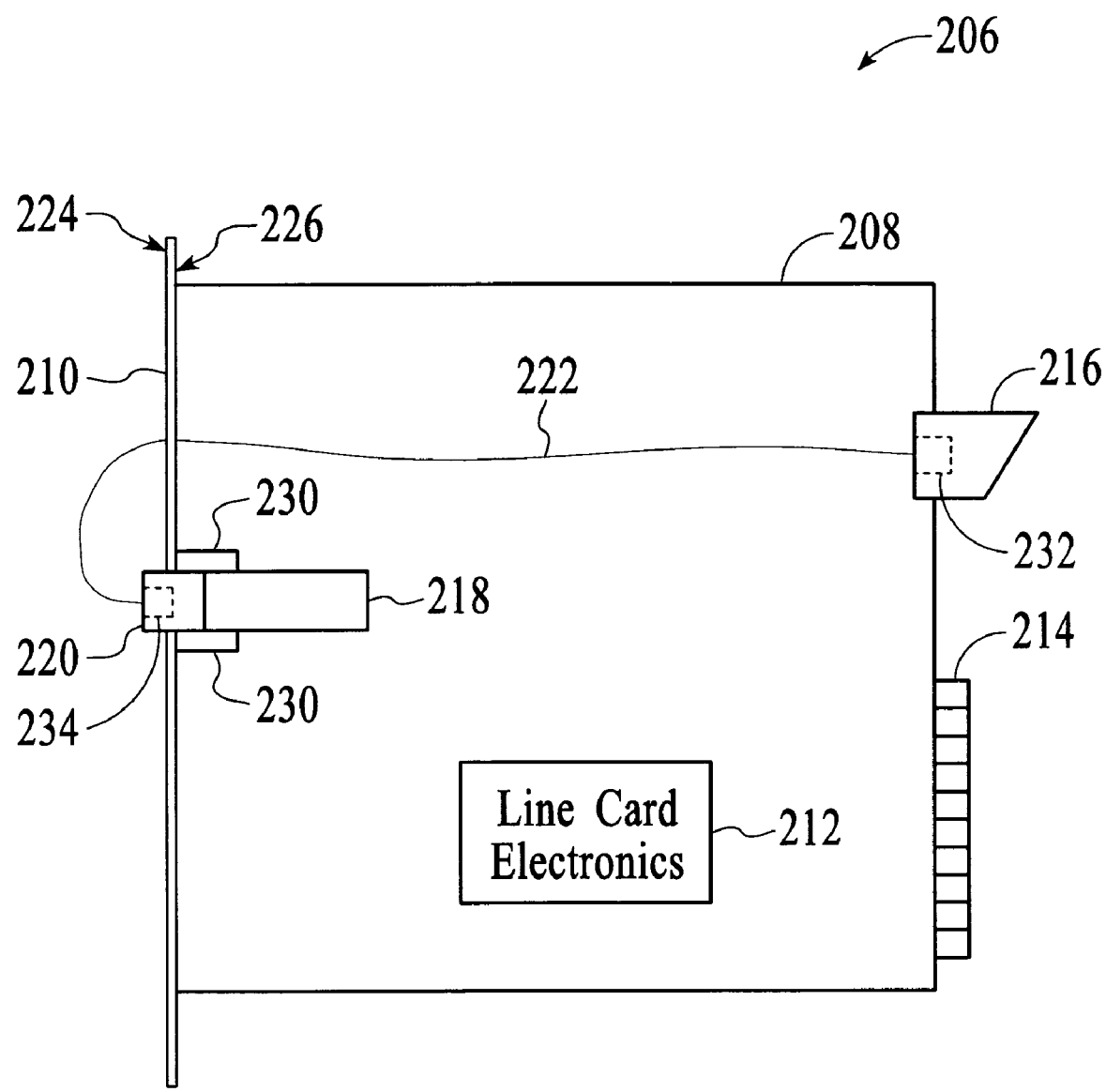
FIG. 2 depicts an example of a line card that is configured according to an embodiment of the invention.

FIG. 2 depicts an example of a line card 206 that is configured according to an embodiment of the invention. The line card includes a base 208, a front panel 210, line card electronics 212, an electrical interface 214, a blind mating optical interface 216, an optical transceiver 218, a transceiver interface 220, and an optical fiber 222. The base of the line card provides the structure upon which line card components are mounted. The line card base may include a combination of structural steel and a printed circuit board, or boards, as is known in the field.

The front panel 210 of the line card 206 is connected to the base 208 and includes a front major surface 224 (referred to herein as the front side) and a back major surface 226 (referred to herein as the back side). The front side of the front panel faces opposite the base and is visible and accessible from outside the chassis (FIG. 1) when the line card is secured within the chassis. The front panel serves various purposes including, sealing off the chassis and line card from the outside environment when the line card is secured within the chassis and providing a structure for mounting optical and electrical interfaces, functional indicators (e.g., status lights etc.), and functional controls (e.g., buttons, switches, knobs etc.). The interfaces, functional indicators, and functional controls are integrated into the front panel so that they are visible and accessible from the front side of the front panel, that is, from outside the chassis when the line card is secured within the chassis. A latching mechanism (not shown) may also be connected to the front panel and/or the base of the line card to secure the line card into the chassis. As depicted in FIGS. 1 and 2, the front panel 110 and 210 sits in a plane that is perpendicular to the plane of the base 108 and 208 and is configured to completely cover the open space of a slot in which the line card is inserted. As with the chassis, the portion of the line card near the front panel is referred to as the front of the line card and the portion of the line card opposite the front panel is referred to as the back of the line card.

The line card electronics 212 include any electronics (integrated circuits, printed circuit boards, etc.) that are used to perform the desired functions of the line card 206. Line card electronics are well-known in the field and the particular electronics are not critical to the invention. The electrical interface 214 provides an electrical interface between the line card electronics and the backplane of the chassis. In the embodiment of FIG. 2, the electrical interface is connected to the base 208 and is located at the back of the line card opposite the front panel 210. Examples of electrical interfaces include PCI, gigabit Ethernet, and I2C. Although not shown, the line card may include electrical interfaces on the front panel, such as coaxial cable or twisted pair interfaces as is known in the field.

In accordance with the invention, the optical fiber management system includes the blind mating optical interface 216, the optical transceiver 218, the transceiver interface 220, and the optical fiber 222 that optically connects the blind mating optical interface to the transceiver interface. The blind mating optical interface functions to optically connect the line card 206 to an optical connection system of the chassis. The blind mating optical interface is connected to the base 208 and is located at the back of the line card opposite the front panel 210. The blind mating optical interface is compatible with a corresponding blind mating optical interface that is connected to the chassis and the two blind mating optical interfaces create an optical connection when the line card is secured within the chassis.

The optical transceiver 218 performs optical-to-electrical and electrical-to-optical signal conversions as is well known in the field. The optical transceiver includes a transceiver interface 220 that allows the optical fiber 222 to be optically connected to the optical transceiver. The transceiver interface may be any transceiver interface, for example, the female portion of an optical plug system. Examples of known transceiver interfaces include subscriber connector (SC), subscriber termination (ST), fiber connector (FC), Lucent connector (LC), enterprise system mainframe connections (ESCON), multifiber terminated push-on (MPO), and multifiber in the telecom RJ form factor (MT-RJ). In the embodiment of FIG. 2, the optical transceiver is located near the front of the line card 206 and the transceiver interface is positioned so that it is accessible from the front side 224 of the front panel 210. That is, the transceiver interface is positioned such that the optical fiber 222 can be connected to and disconnected from the transceiver interface by a service technician while the line card is secured within a chassis. The optical transceiver may be removably mounted to the line card (using a transceiver docking mechanism 230) such that the optical transceiver can be removed from the line card via the front panel while the line card is secured within a chassis. A removably mounted optical transceiver allows the optical transceiver to be serviced or replaced without having to remove the entire line card from the chassis.

The optical fiber 222 creates an optical signal path between the blind mating optical interface 216 and the transceiver interface 220. The optical fiber includes a connector 232 at one end that is compatible with the blind mating optical interface and a connector 234 at the other end that is compatible with the transceiver interface. In an alternative embodiment, the optical fiber may be connected to the blind mating optical interface by a permanently fixed interface. The optical fiber passes from the blind mating optical interface through the front panel 210 so that it can be connected to the transceiver interface from the front side 224 of the front panel. It is critical that the optical fiber and the transceiver interface be accessible from the front side of the front panel when the line card is secured within a chassis so that the fiber can be connected to and disconnected from the transceiver interface without having to remove the line card from the chassis. It may be desirable to disconnect the optical fiber from the transceiver interface to allow servicing of the optical transceiver or to connect the optical transceiver to testing equipment. The optical fiber may be secured to the base 208 of the line card by, for example, plastic ties or metal guides. Although a single optical fiber is described in FIG. 2 as the optical signal path, other optical signal paths are possible.

Figure 3:
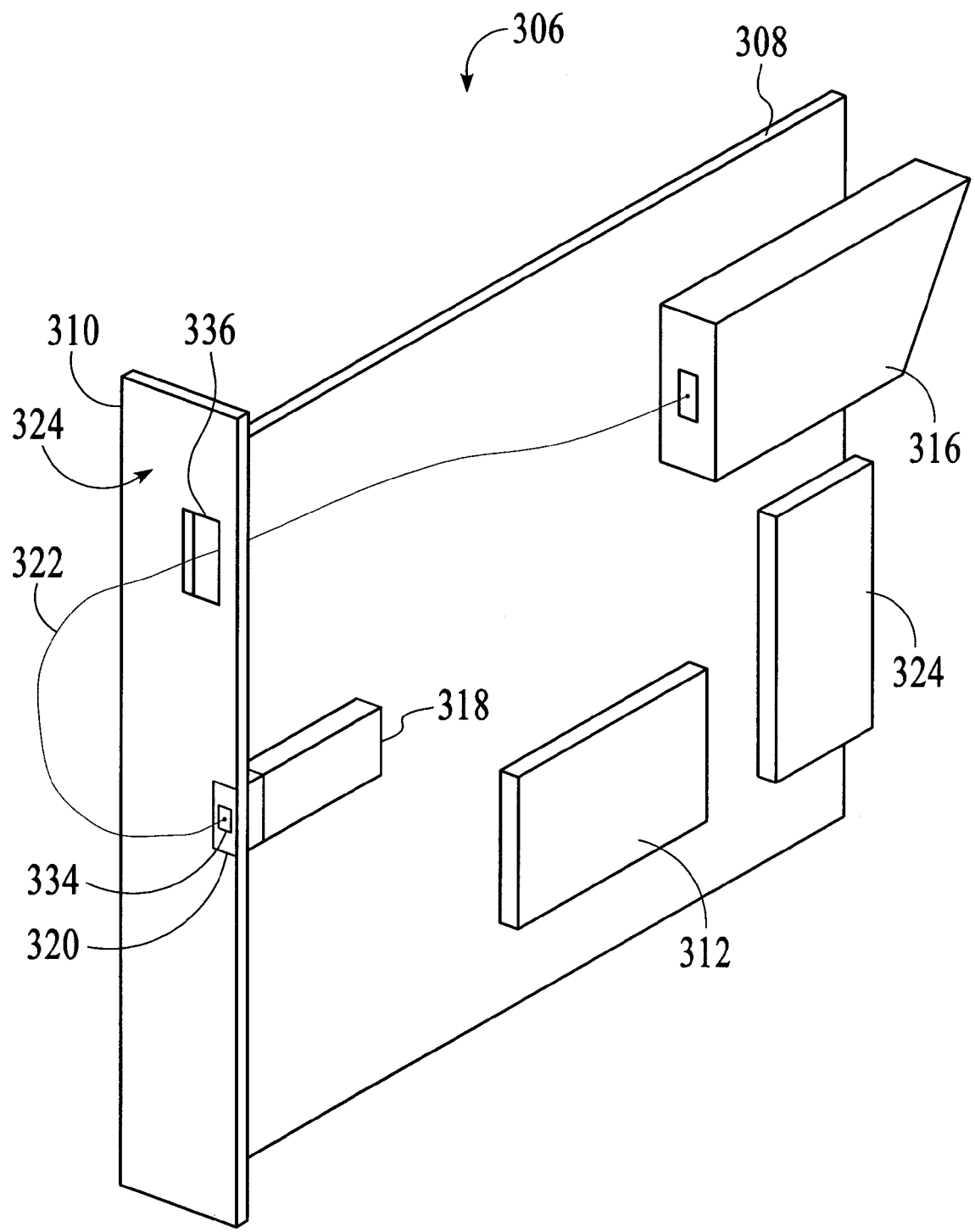
FIG. 3 depicts a perspective view of the line card depicted in FIG. 2.

FIG. 3 depicts a perspective view of the line card 206 depicted in FIG. 2. The perspective view of the line card 306 depicts the optical fiber 322 passing through a hole 336 in the front panel 310 to optically connect the blind mating optical interface 316 to the transceiver interface 320. Although the optical fiber is shown passing through a hole in the front panel, other means such as, for example, a notch are possible for getting the optical fiber from the blind mating optical interface at the back of the line card to the front side 324 of the front panel.

Figure 4:
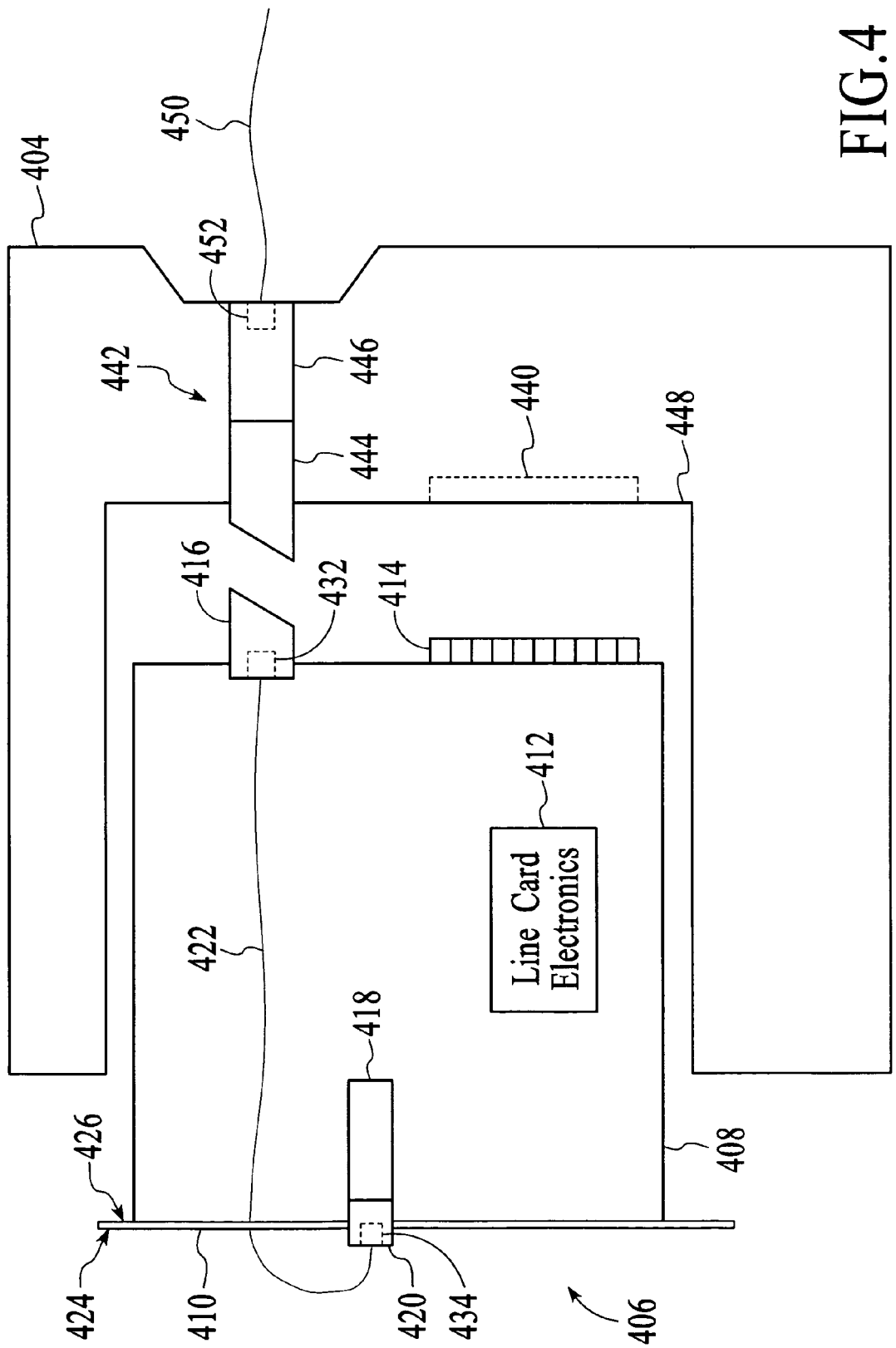
FIG. 4 depicts a side view of a line card and a chassis that is compatible with the line card in accordance with an embodiment of the invention.

FIG. 4 depicts a side view of a line card 406 and a chassis 404 that is compatible with the line card. The line card 406 is similar to the line card 206 from FIG. 2. The chassis includes an electrical interface 440 that is compatible with the electrical interface of the line card. The chassis also includes an optical connection system 442 that has a blind mating optical interface 444 and an external optical interface 446. The blind mating optical interface is compatible with the blind mating optical interface 416 of the line card 406 and is aligned to receive the blind mating optical interface of the line card when the line card is inserted into the chassis. The blind mating optical interfaces 416 and 444 allow an optical connection to be made by simply sliding the line card into a slot of the chassis. The connection can be made without a service technician being able to see the blind mating optical interface of the line card or the blind mating optical interface of the chassis. The blind mating optical interfaces of the line card and chassis include self alignment features (not shown) that are well known in the field of blind mating optical interfaces. In the embodiment of FIGS. 2-4, the blind mating optical interfaces and the electrical interfaces are located along the back edge of the line card and are aligned such that the optical and electrical interfaces fully mate with the respective interfaces when the line card is secured within the chassis.

The external optical interface 446 of the chassis' optical connection system 442 provides the interface to an external optical fiber 450 and is accessible from the back of the chassis 404. The external optical fiber includes a connector 452 that is compatible with the external optical interface. The external optical fiber is typically connected to other network systems, such as routers switches, end stations, patch panels, etc. As is described in more detail below, the external optical fiber often includes multiple fibers that are bundled together into, for example, a ribbon cable.

When the line card 406 is secured within the chassis 404, the electrical and optical interfaces of the line card and the chassis 414, 416, 440, and 444 are fully mated. In particular, the blind mating optical interfaces of the line card and the chassis 416 and 444 create an optical connection that allows optical signals to be exchanged between the optical transceiver 418 and the external optical fiber 450. Using the above-described optical fiber management technique, the line card can be removed from the chassis without disconnecting the optical fiber 422 from the optical transceiver at the transceiver interface 420. Major benefits of the optical fiber management technique are realized when a line card and chassis are configured to support multiple optical fiber connections especially in networks with large numbers of optical fibers and in networks that utilize parallel optical fiber bundles (also known as ribbon cables).

Figure 5:
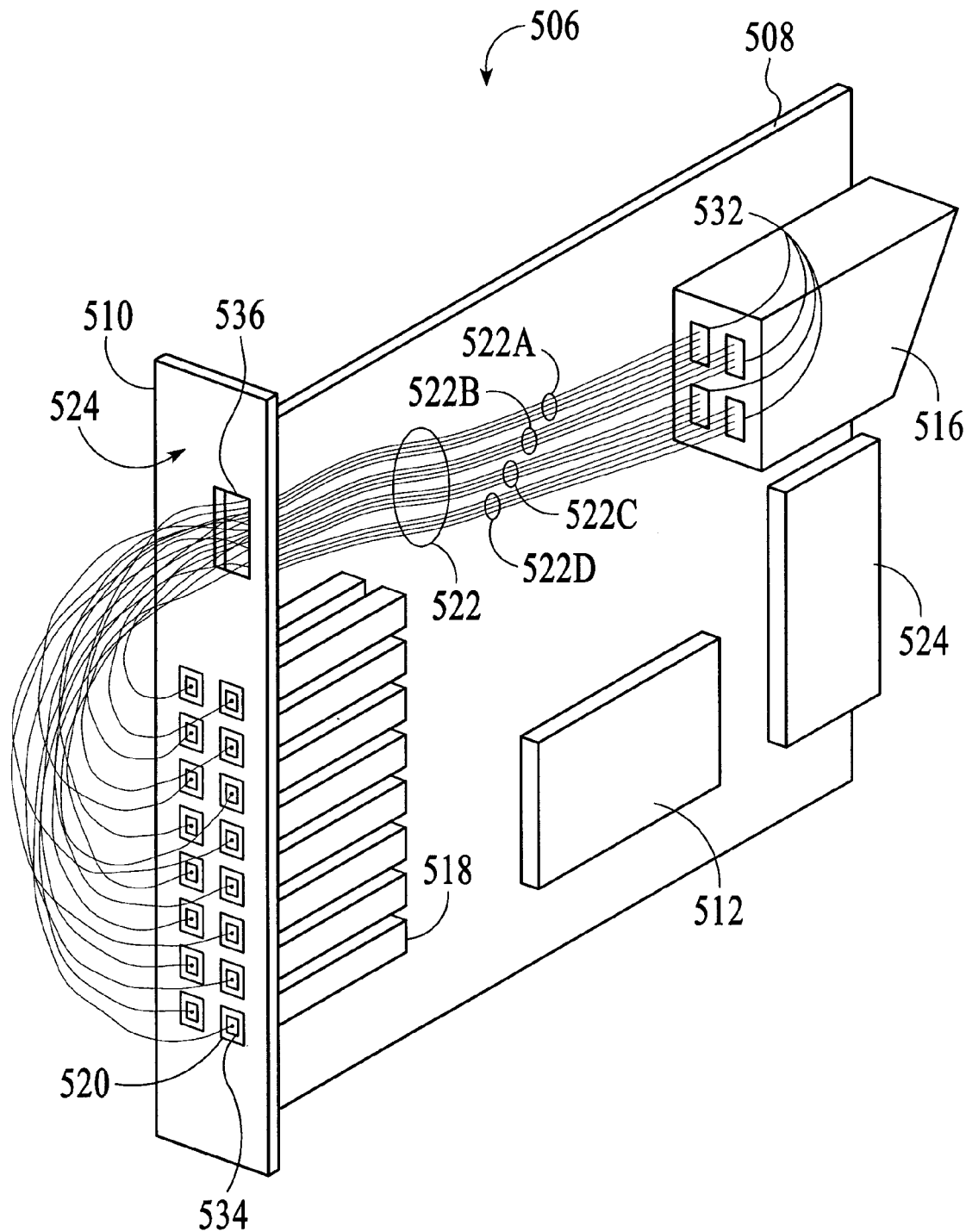
FIG. 5 depicts a perspective view of a line card that is configured to support multiple optical fiber interfaces using techniques similar to those described with reference to FIGS. 2-4.

FIG. 5 depicts a perspective view of a line card 506 that is configured to support multiple optical fiber interfaces using techniques similar to those described with reference to FIGS. 2-4. The line card includes multiple optical transceivers 518 and corresponding transceiver interfaces 520 (e.g., sixteen optical transceivers and transceiver interfaces), a multi-fiber blind mating optical interface 516, and multiple connecting optical fibers 522. In an embodiment, the optical fibers are bundled into groups of fibers 522A, 522B, 522C, and 522D (e.g., ribbon cables). For example, the optical fibers may be bundled into groups of four optical fibers per ribbon cable. At the blind mating optical interface end of the optical fibers, the groups of optical fibers may have ribbon connectors 532 that are compatible with corresponding ribbon connectors (not shown) of the blind mating optical interface 516. At the transceiver interface end, the optical fibers are separated from each other and each optical fiber has an individual connector 534. The individual connectors of the fibers are individually connectable to the individual transceiver interfaces 520. Because each fiber is individually connectable to a transceiver interface, the fibers can be individually disconnected from the transceiver interfaces for operations such as servicing and testing.

Figure 6:
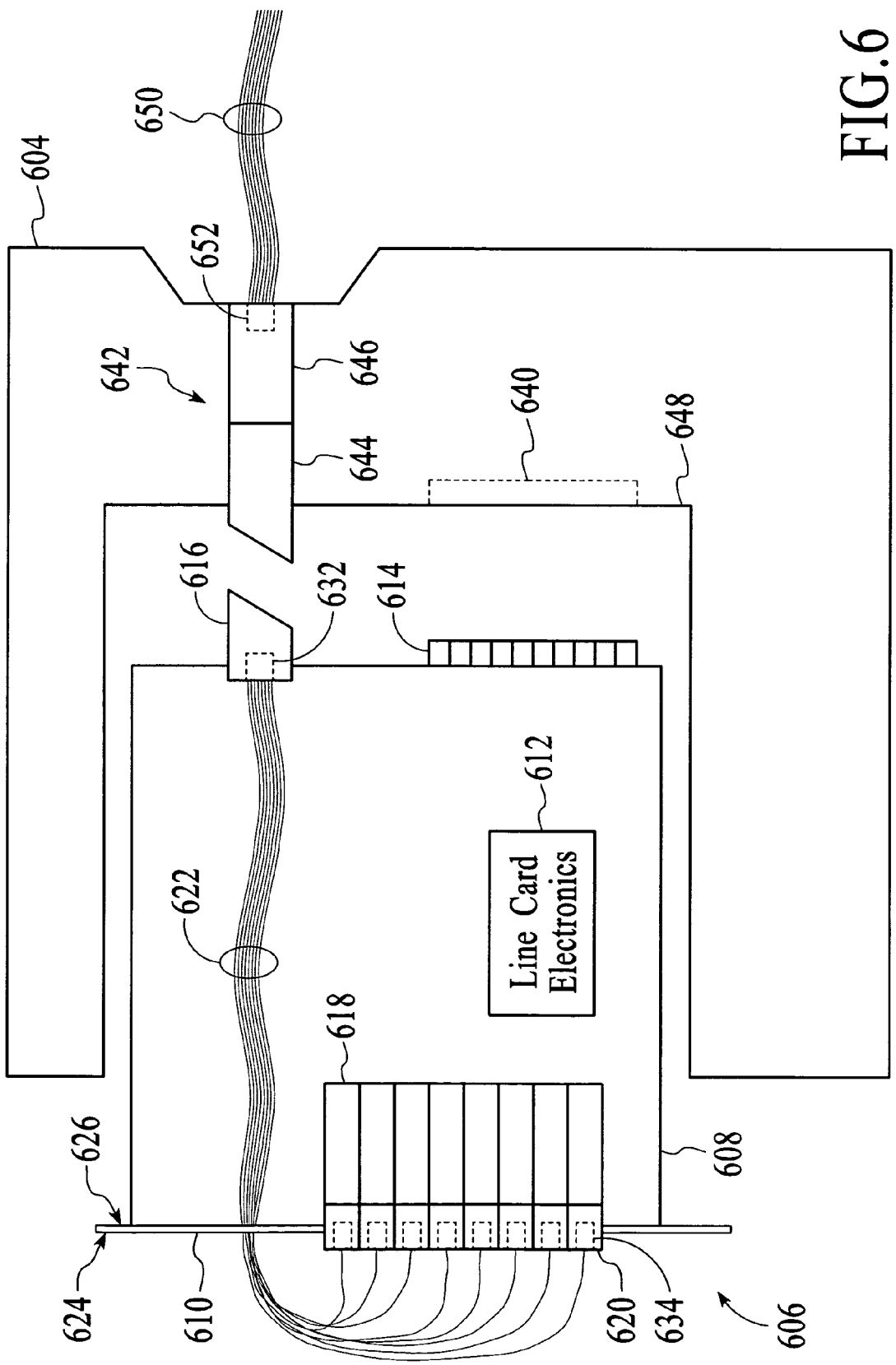
FIG. 6 depicts a side view of a line card with multiple optical transceivers and a chassis that is compatible with the line card.

FIG. 6 depicts a side view of a line card 606 with multiple optical transceivers 618 and a chassis 604 that is compatible with the line card. A ribbon cable 650 that includes multiple optical fibers is connected to the back of the chassis via the external optical interface 646. In this configuration, the ribbon cable is connected at the back of the chassis to a compatible ribbon connector of the external optical interface. The optical fibers within the line card may also be bundled into a ribbon cable 622, or cables, and then separated from each other at the front side 624 of the front panel 610 so that each fiber can be individually connected to a corresponding optical transceiver 618. Each of the separate optical fibers has a connector 634 that is compatible with a transceiver interface 620 so that the optical fibers (or fiber pairs, or groups of fibers) can be individually connected to and disconnected from the transceivers.

Figure 7:
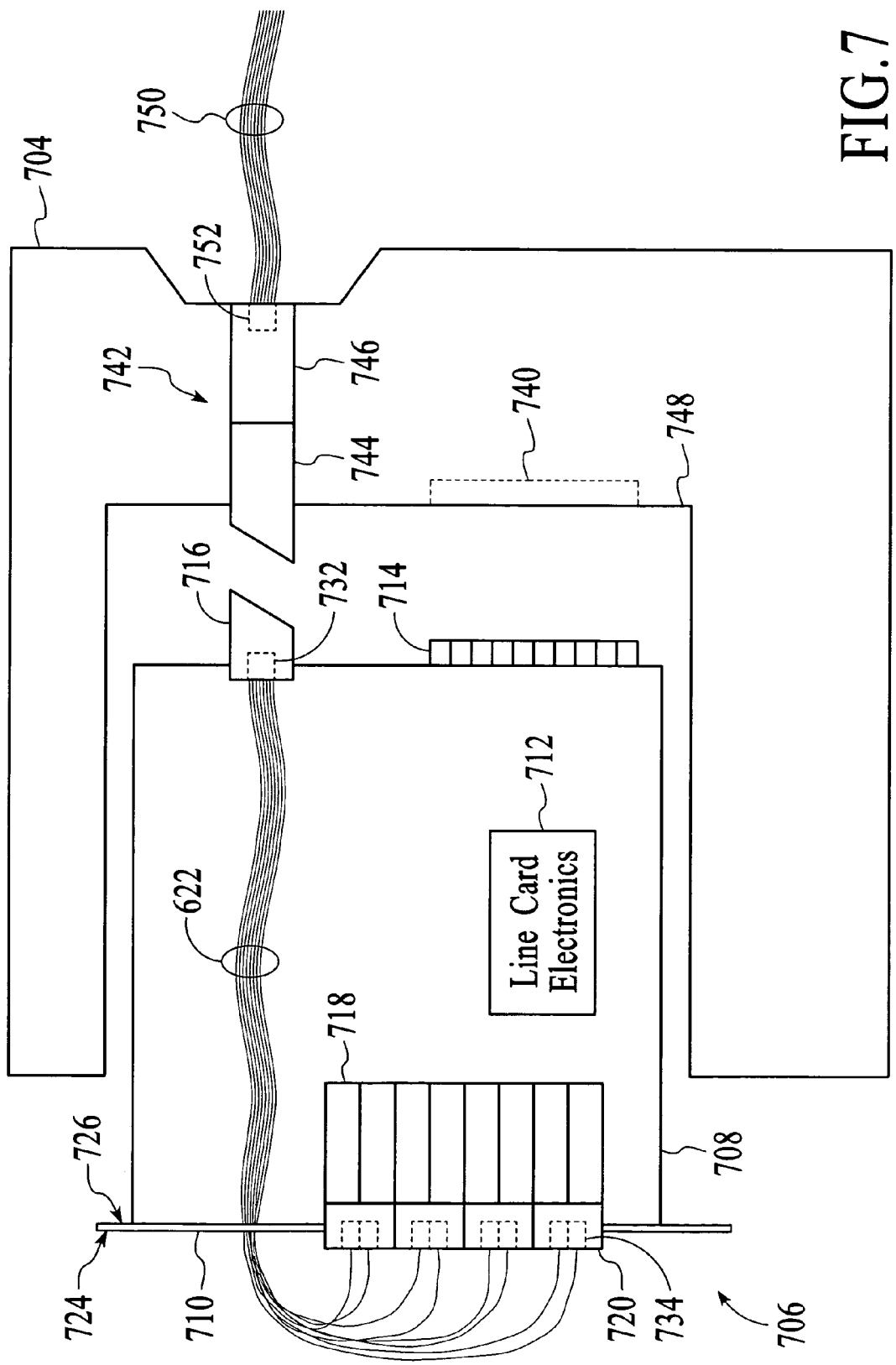
FIG. 7 depicts a side view of a line card with transceiver interfaces that are configured for fiber pairs and integrated connector pairs.

In an alternative embodiment, some of the optical fibers may be bundled together. For example, it is common to have fiber pairs bundled together, with the fiber pairs being used for communications in opposite directions. With fiber pairs, the transceiver interfaces and connectors may also be integrated together such that fiber pairs and their associated connectors are individually removable. For example, FIG. 7 depicts fiber pairs that include integrated connectors (e.g., connectors that connect to parallel fibers). Although fiber pairs are described, other combinations of fiber groupings are possible.

Advantages of the multi-fiber configurations described above include:
a) the line card can be removed from the chassis without individually disconnecting the optical fibers at the transceiver interfaces, thereby eliminating the possibility of connection errors;
b) a fixed optical connection to the chassis can be maintained at the external optical interface even while line cards are removed for servicing;
c) the chassis is compatible with external connections to ribbon cables (ribbon cables are a valuable fiber management tool as the number of fibers in a network increases) while providing individual port serviceability;
d) the optical fibers can be individually connected to and disconnected from the transceiver interfaces, which enables individual operations (e.g., testing or servicing) to be performed at each port without having to disconnect any other ports; and
e) when the optical transceivers are removable, the multi-fiber configuration allows individual optical transceivers to be disconnected from the corresponding optical fiber and removed from the line card without removing the line card from the chassis.

Figure 8:
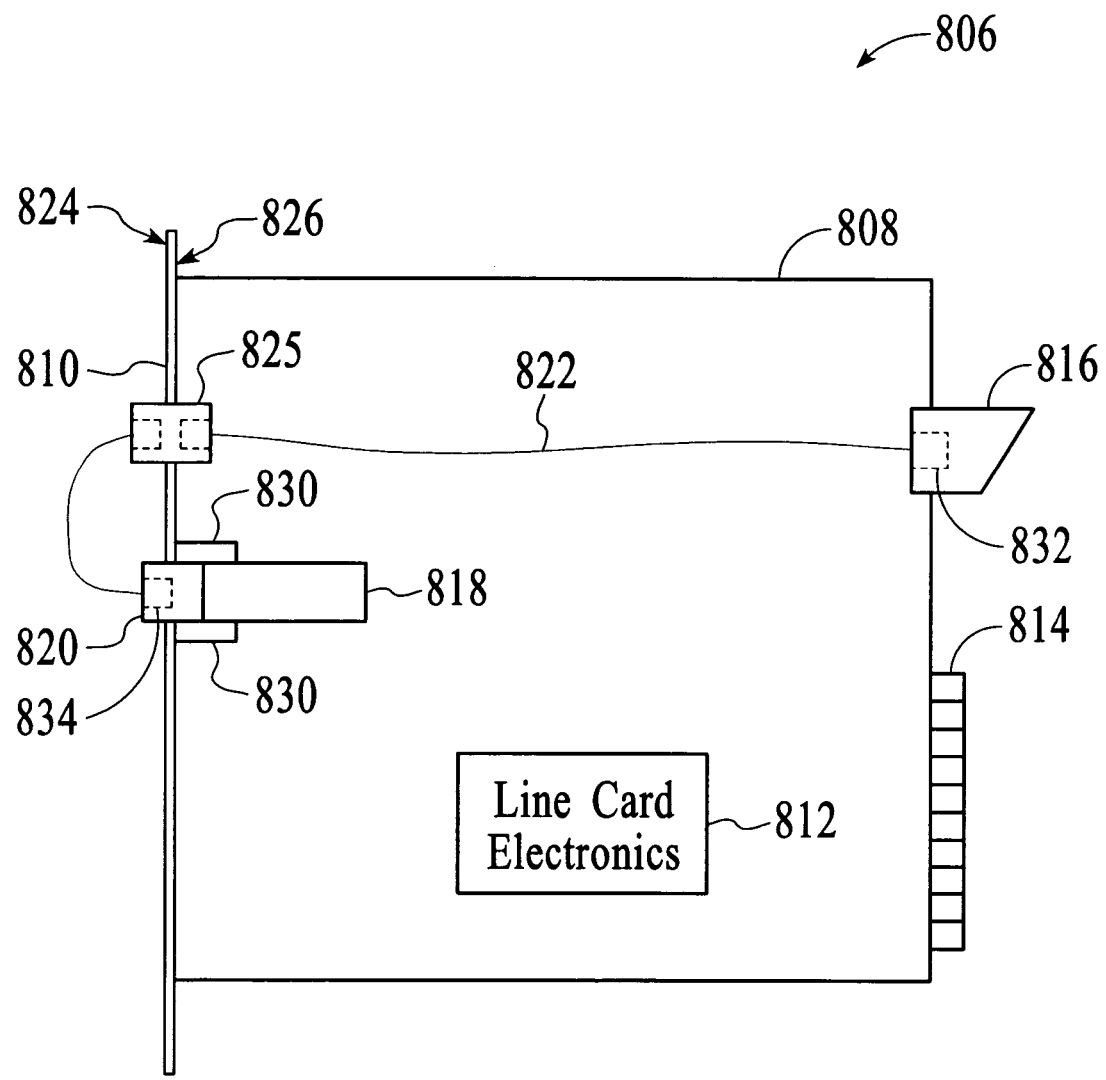
FIG. 8 depicts a side view of a line card in which the optical connection between the blind mating optical interface and the optical transceiver has been broken into two fibers that connect to a common connector at the front panel.

The optical signal path between the blind mating optical interface and the transceiver interface can be accomplished with multiple fibers as opposed to the single fiber 222 and 322 as described with reference to FIGS. 2 and 3. In an alternative embodiment, the fiber is segmented into at least two fibers that are optically connected at the front panel. For example, one fiber segment runs from the blind mating interface to a connector at the back side of the front panel and a second segment runs from a connector at the front side of the front panel to the transceiver interface. FIG. 8 depicts an example in which the optical connection between the blind mating interface 816 and the optical transceiver 818 has been broken into two fibers 822 and 823 that connect to a common connector 825 at the front panel 810. This configuration allows the optical fiber that is on the outside of the line card to be removed from the line card while the line card is secured within the chassis. Although one example of an alternative embodiment of the optical signal path is described, others are possible. Additionally, although optical fibers are described herein as the optical signal path, a portion of the optical path between the blind mating interface and the transceiver interface could be established without using an optical fiber. For example, planar optical waveguides could provide a portion of the optical signal path between the blind mating interface and the transceiver interface. Critical aspects of the optical signal path between the blind mating interface and the transceiver interface are that optical signals can be reliably communicated between the two devices and that the optical connection can be removed at the transceiver interface from the front of the line card while the line card is secured within the chassis.

Figure 9:
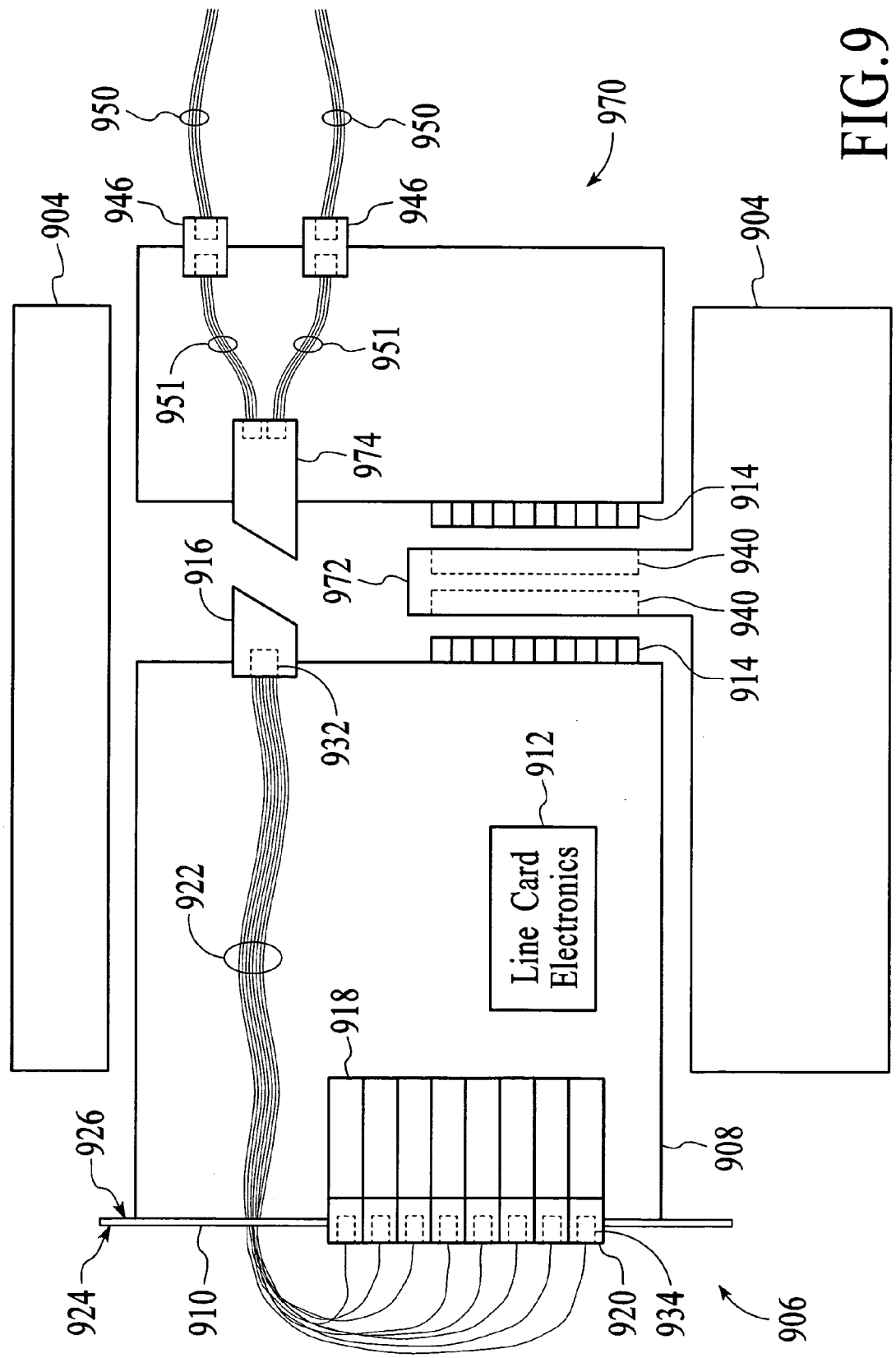
FIG. 9 depicts a side view of a chassis that accepts line cards from the front and from the back in which the blind mating occurs directly between the front and back line cards.

FIG. 9 depicts a side view of a chassis that accepts line cards from the front (e.g., line card 906) and from the back (e.g., line card 970). In the example of FIG. 9, the chassis includes a midplane 972, with electrical interfaces 940 and front and back slots for receiving line cards. The front line card is similar to the line cards described with reference to FIGS. 3-8 except that the blind mating interface 916 is aligned to mate with the blind mating interface 974 of the line card that is inserted from the back of the chassis, the "back" line card. In the example of FIG. 9, the back line card includes the blind mating interface and two external optical interfaces 946. The blind mating interface and the two external optical interfaces are connected by fiber bundles 951. In another alternative embodiment, the chassis midplane may include blind mating interfaces that are aligned to receive and optically connect the blind mating interfaces of the front and back line cards.

Although the systems described with reference to FIGS. 5 and 6 include sixteen independent transceiver interfaces and sixteen independently connectable fibers, in another embodiment the optical transceivers and optical fibers may be bundled into groups, for example, groups of four. For example, the optical transceivers may be integrated into groups of four with transceiver interfaces being configured to accept a ribbon connector that includes four different fibers. In this configuration, groups of four fibers can be connected to and disconnected from the line card. This allows some of the ports to be accessed without having to disconnect all of the other ports on the line card.

Throughout the description, the term "port" refers generally to the combination of an optical transceiver, the transceiver interface, and any electronics associated with the optical transceiver. The term port is well known in the networking field.

Although the blind mating optical interface 216, 316, 416, 516, and 616 of the line card 206, 306, 406, 506, and 606 is located at the back of the line card, it could be located somewhere else as long as it is able to connect with a compatible blind mating optical interface 444 and 644 of the chassis 404 and 604.

Although specific embodiments of the invention have been described and illustrated, the invention is not to be limited to the specific forms or arrangements of parts as described and illustrated herein. The invention is limited only by the claims.

What is claimed is:

1. A line card for a chassis-based network system comprising:
   a front panel having front and back sides;
   an electrical interface located opposite the front panel;
   a blind mating optical interface located opposite the front panel;
   an optical transceiver having a transceiver interface that is accessible from the front side of the front panel when the line card is secured within a chassis of a chassis-based network system; and
   means for optically connecting the blind mating optical interface and the transceiver interface.

2. The line card of claim 1 wherein the means for optically connecting includes an optical fiber that is connected between the blind mating optical interface and the transceiver interface such that the line card can be removed from a chassis without optically disconnecting the optical fiber from the transceiver interface.

3. The line card of claim 1 wherein the means for optically connecting includes an optical fiber that is connected between the blind mating optical interface and the transceiver interface and that accesses the transceiver interface from the front side of the front panel.

4. The line card of claim 1 wherein the means for optically connecting includes an optical fiber that is connected to the blind mating optical interface at one end and having a connector that is compatible with the transceiver interface at the other end and wherein the connector is connected to the transceiver interface from the front side of the front panel.

5. The line card of claim 1 wherein the blind mating optical interface and the electrical interface are located along a back edge of the line card.

6. The line card of claim 1 wherein the blind mating optical interface is positioned on the line card to mate with a blind mating optical interface of a chassis.

7. The line card of claim 1 further including a transceiver docking mechanism that allows the optical transceiver to be removed from the line card without removing the line card from a chassis.

8. The line card of claim 1 wherein the front side of the front panel is accessible when the line card is secured within a chassis.

9. A line card for a chassis-based network system comprising:
   a front panel having front and back sides;
   an electrical interface located opposite the front panel;
   a blind mating optical interface located opposite the front panel;
   an optical transceiver having a transceiver interface that is accessible from the front side of the front panel; and
   an optical fiber that is connected between the blind mating optical interface and the transceiver interface.

10. The line card of claim 9 wherein the line card can be removed from a chassis without optically disconnecting the optical fiber from the transceiver interface.

11. The line card of claim 9 wherein the optical fiber accesses the transceiver interface from the front side of the front panel.

12. A chassis-based network system comprising:
    a chassis comprising;
       a line card slot;
       an electrical interface associated with the line card slot;

an optical connection system associated with the line card slot having a blind mating optical interface and an external optical interface; and a line card that is secured within the line card slot of the chassis, the line card comprising;

a front panel having front and back sides;

an electrical interface located opposite the front panel that is aligned to mate with the electrical interface of the chassis;

a blind mating optical interface located opposite the front panel that is aligned to mate with the blind mating optical interface of the chassis;

an optical transceiver having a transceiver interface that is accessible from the front side of the front panel; and an optical fiber that is connected between the blind mating optical interface and the transceiver interface.

\* \* \* \* \*

UNITED STATES PATENT AND TRADEMARK OFFICE
CERTIFICATE OF CORRECTION

PATENT NO.       : 7,636,506 B2                            Page 1 of 1
APPLICATION NO.  : 10/843898
DATED            : December 22, 2009
INVENTOR(S)      : Jean-Philippe Fricker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1204 days.

Signed and Sealed this

Twenty-first Day of December, 2010

David J. Kappos
*Director of the United States Patent and Trademark Office*